United States Patent [19]
Waterman et al.

[11] Patent Number: 5,323,882
[45] Date of Patent: Jun. 28, 1994

[54] DISC BRAKE FRICTION PAD ASSEMBLY

[76] Inventors: George H. Waterman, 1301 Joshua Dr., Troy, Mich. 48098; David M. Horne, 3068 Lexington Dr., Waterford, Mich. 48328

[21] Appl. No.: 17,771

[22] Filed: Feb. 16, 1993

[51] Int. Cl.$^5$ .............................................. F16D 65/00
[52] U.S. Cl. ................................... 188/73.1; 188/73.37
[58] Field of Search ................ 188/73.1, 73.33, 73.39, 188/73.37, 250 A, 250 B, 73.46, 73.47

[56] References Cited

U.S. PATENT DOCUMENTS

| | | | |
|---|---|---|---|
| Re. 30,255 | 4/1980 | Rath et al. | 188/73.3 |
| 4,056,174 | 11/1977 | Wienand et al. | 188/73.5 |
| 4,289,216 | 9/1981 | Shirai et al. | 188/73.1 |
| 4,527,669 | 7/1985 | Meyer et al. | 188/73.38 |
| 4,907,677 | 3/1990 | Yamashita et al. | 188/73.1 |
| 5,025,897 | 6/1991 | Hirashita et al. | 188/73.1 |
| 5,033,590 | 7/1991 | Kobayashi et al. | 188/73.1 |
| 5,060,766 | 10/1991 | Kondo | 188/73.1 |
| 5,083,641 | 1/1992 | Kleiva | 188/250 B |

FOREIGN PATENT DOCUMENTS 0224531  9/1989  Japan ............................ 188/250 B Primary Examiner—Mark T. Le
Attorney, Agent, or Firm—Harness, Dickey & Pierce

[57] ABSTRACT

A friction pad assembly and backing plate therefor features a pair of opposing upper and lower abutments, with the engagement surface of the lower abutments being recessed by a predetermined magnitude relative to the engagement surfaces of the upper abutments. The lower abutments are recessed relative to the upper abutments, such that lower abutments will not contact the bracket which supports the friction pad assembly under resting and light braking conditions. However, the lower abutments at the pressured end of the friction pad assembly will come into contact with the caliper bracket during heavy braking conditions in order to reduce the load on the upper abutment. While the force applied by the pad to the bracket support structure under these conditions may cause the un-pressured end of the friction pad assembly to lift slightly, the clearance thereby produced will be too small to cause perceptible clacking noise upon brake release.

16 Claims, 8 Drawing Sheets

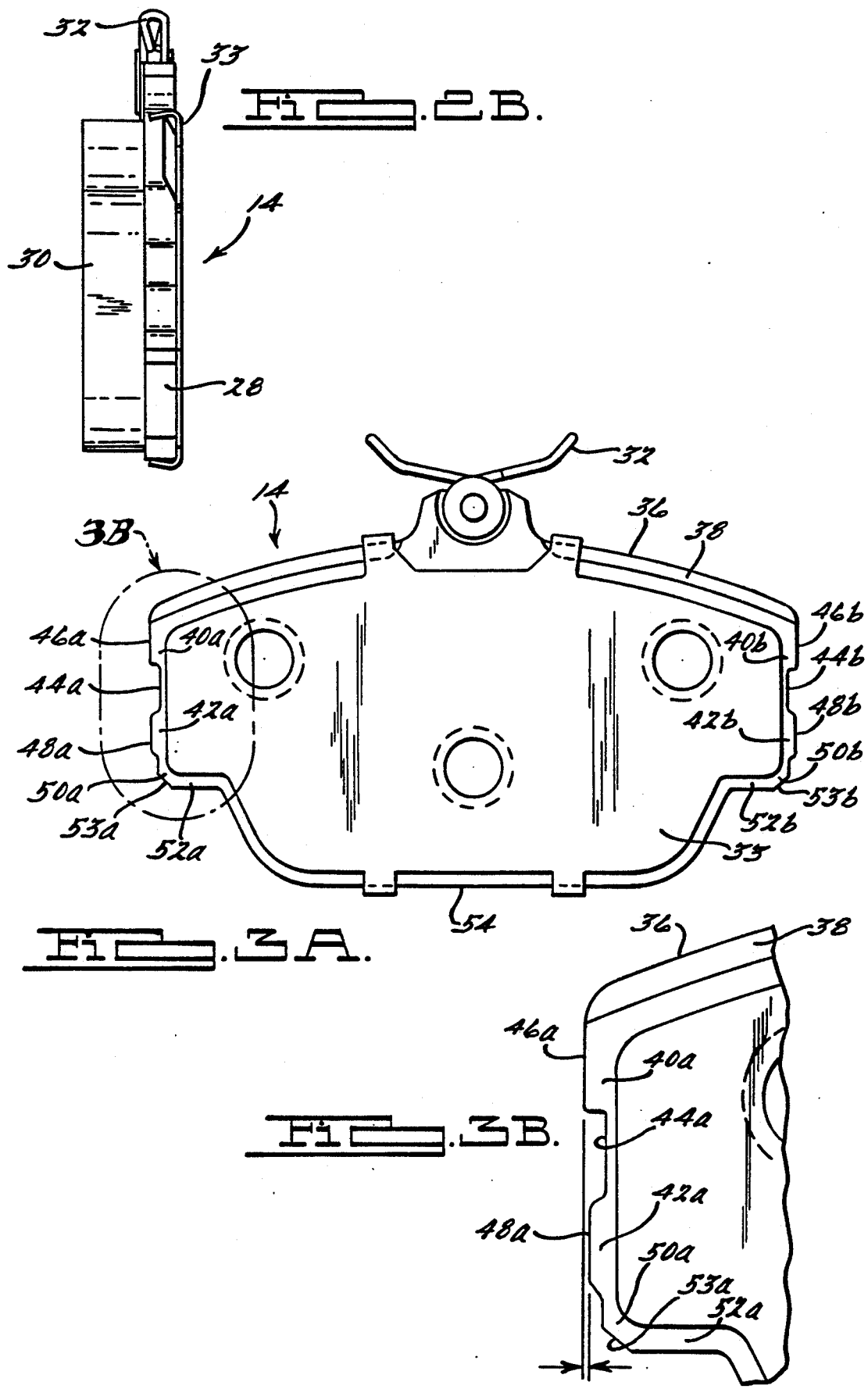

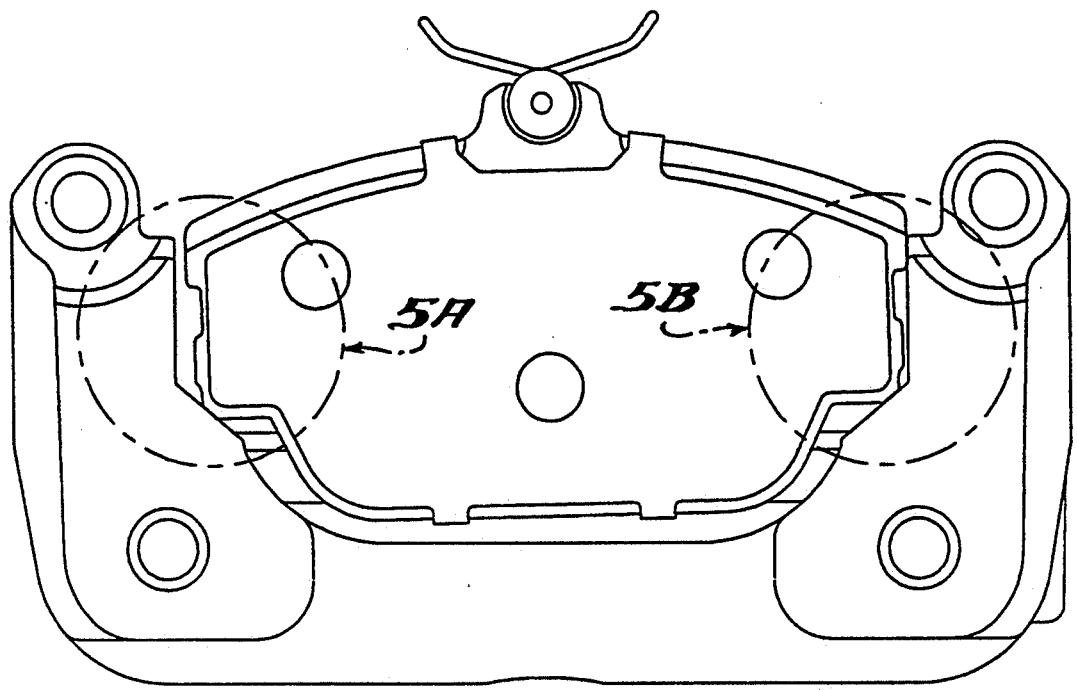
FIG. 5.
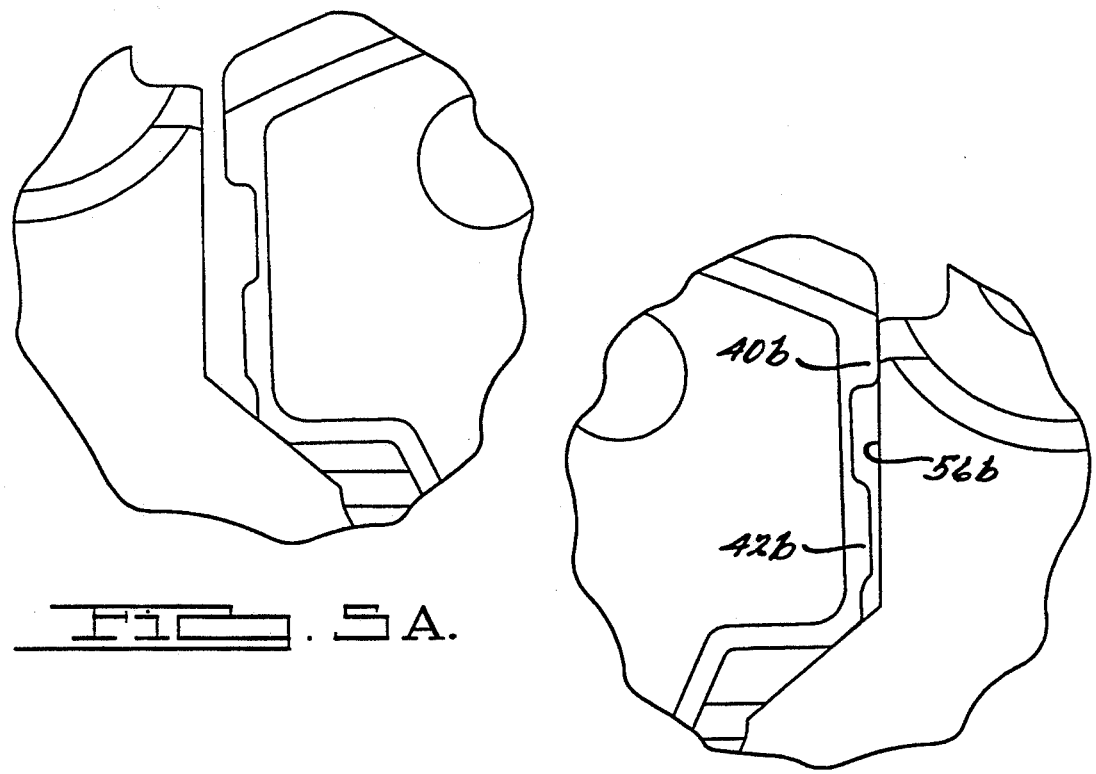
FIG. 5A.
FIG. 5B.

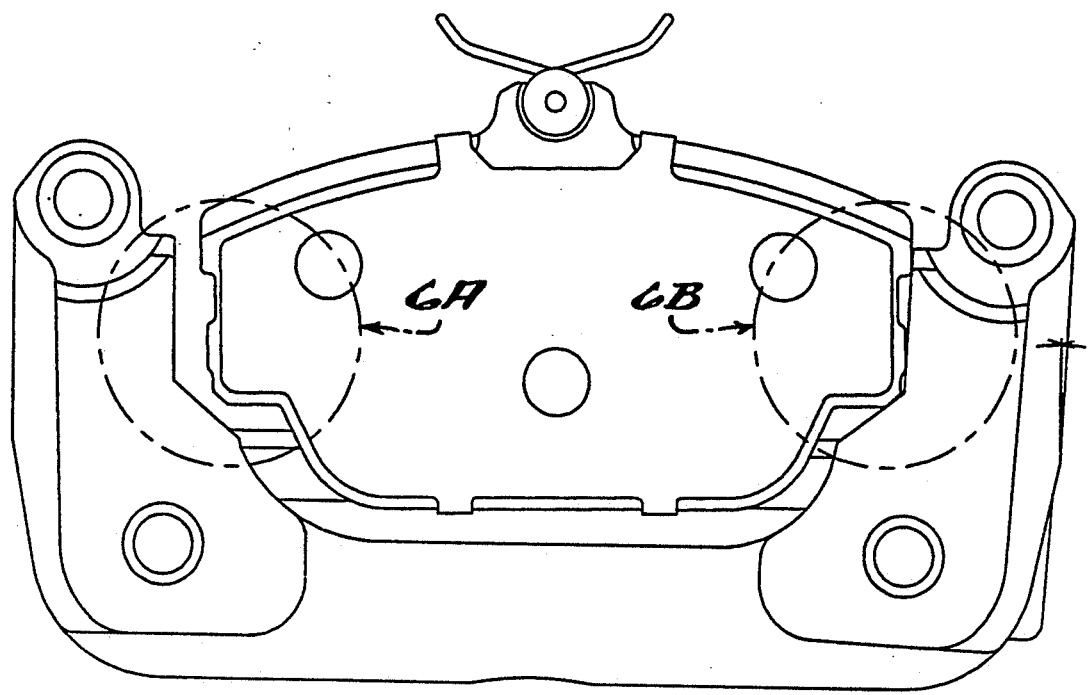
FIG. 6.
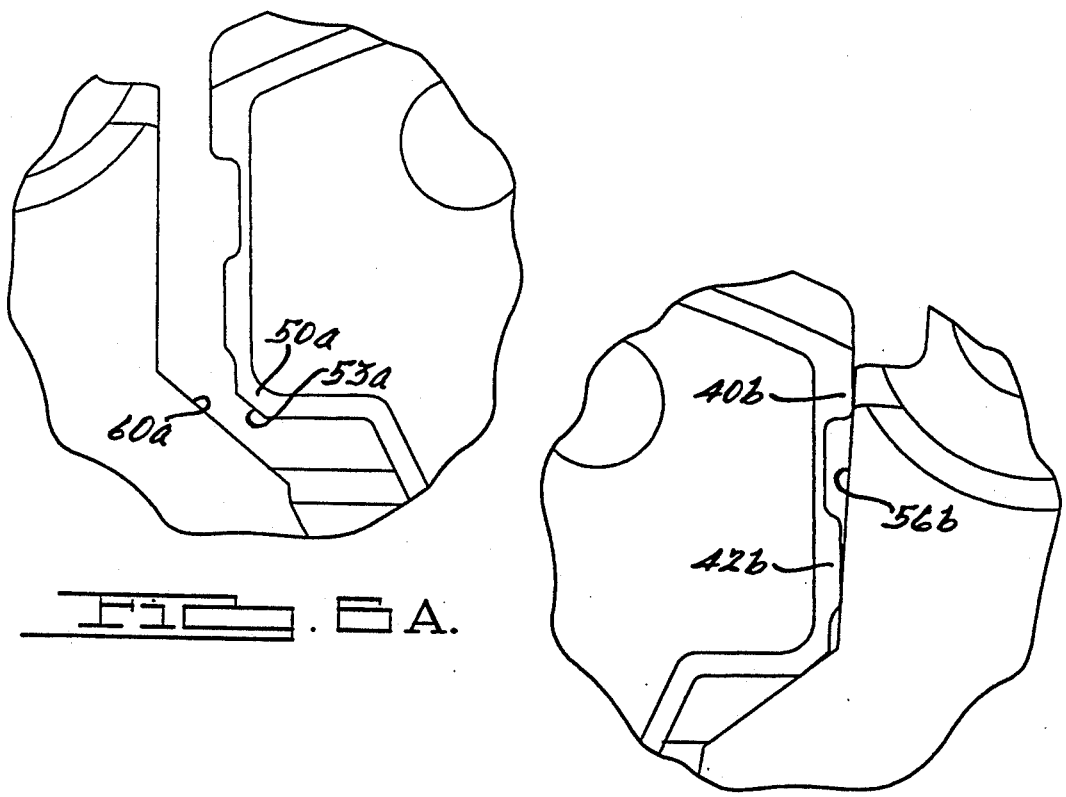
FIG. 6A.
FIG. 6B.

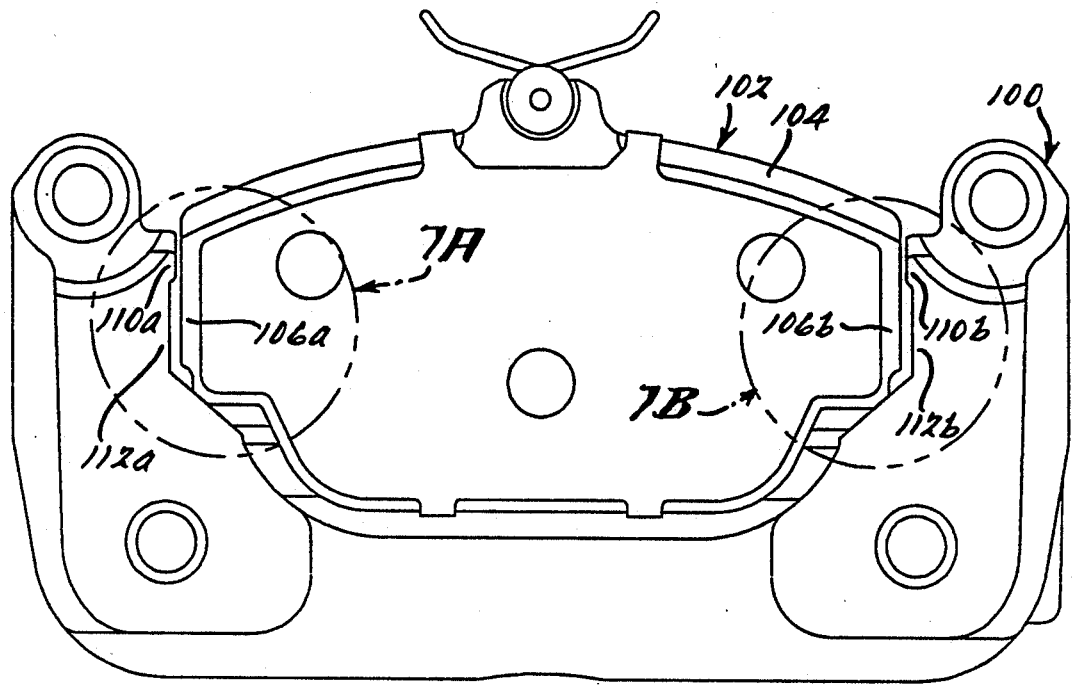
FIG. 7.
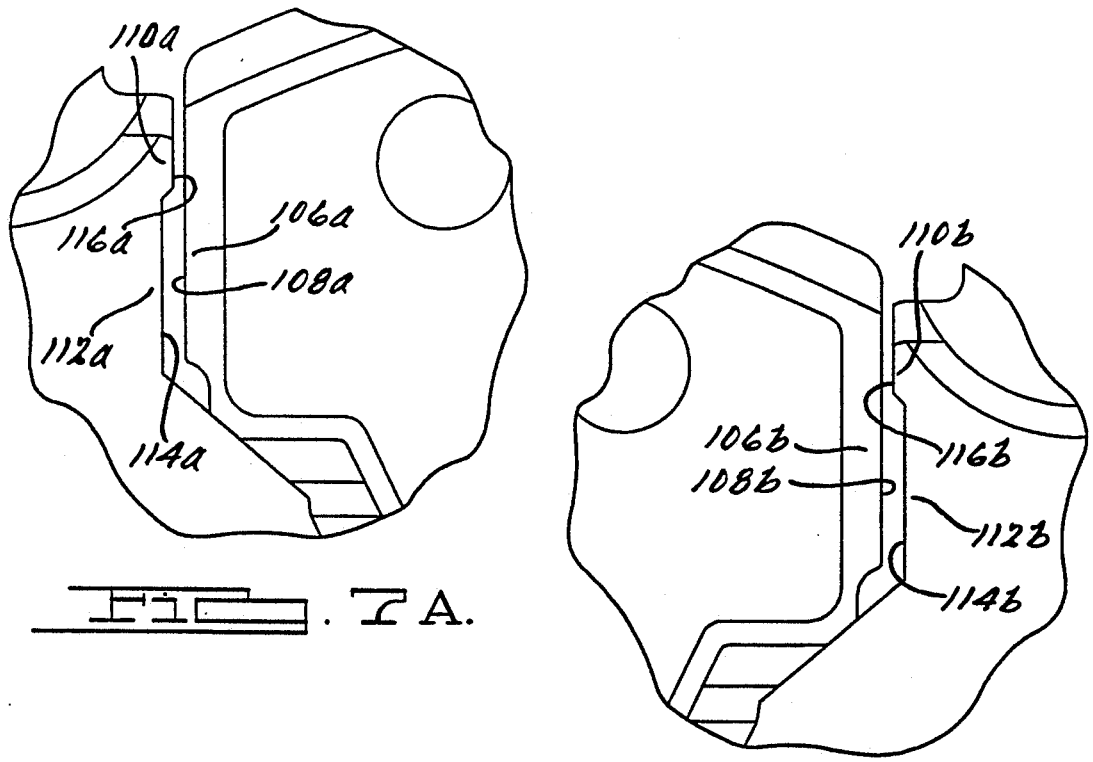
FIG. 7A.
FIG. 7B.

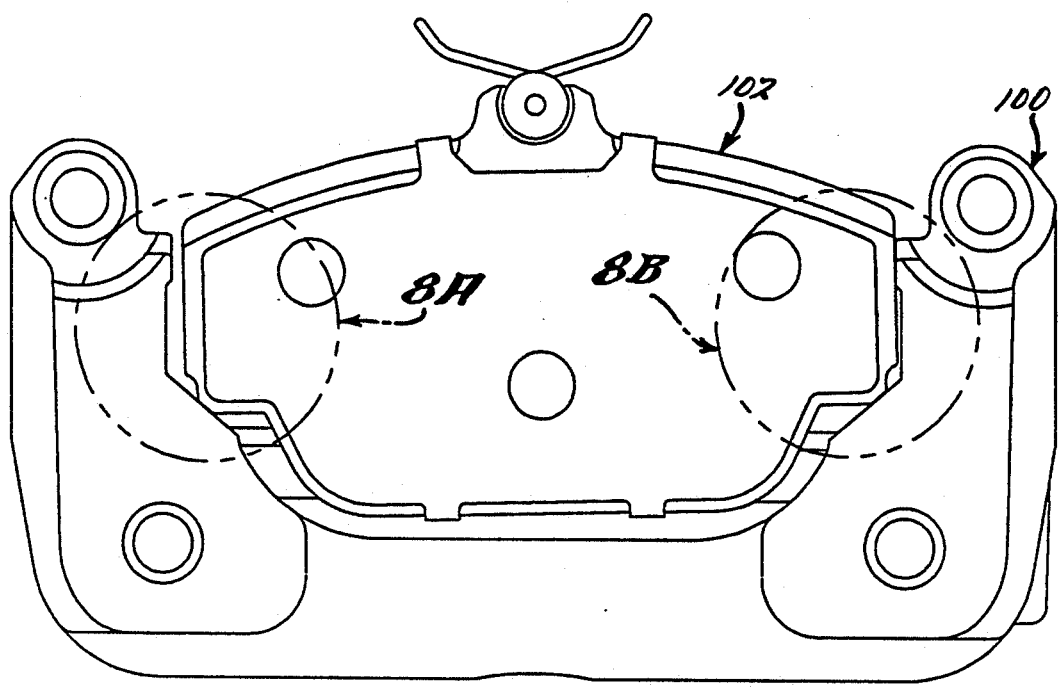
FIG. 8.
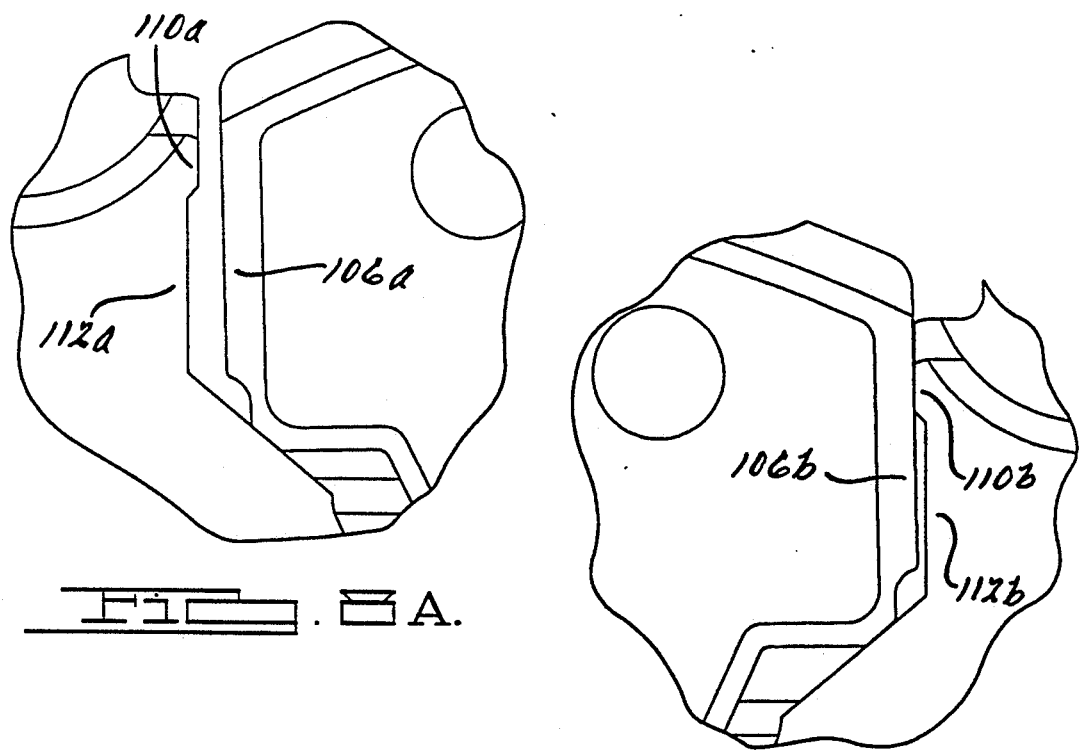
FIG. 8A.
FIG. 8B.

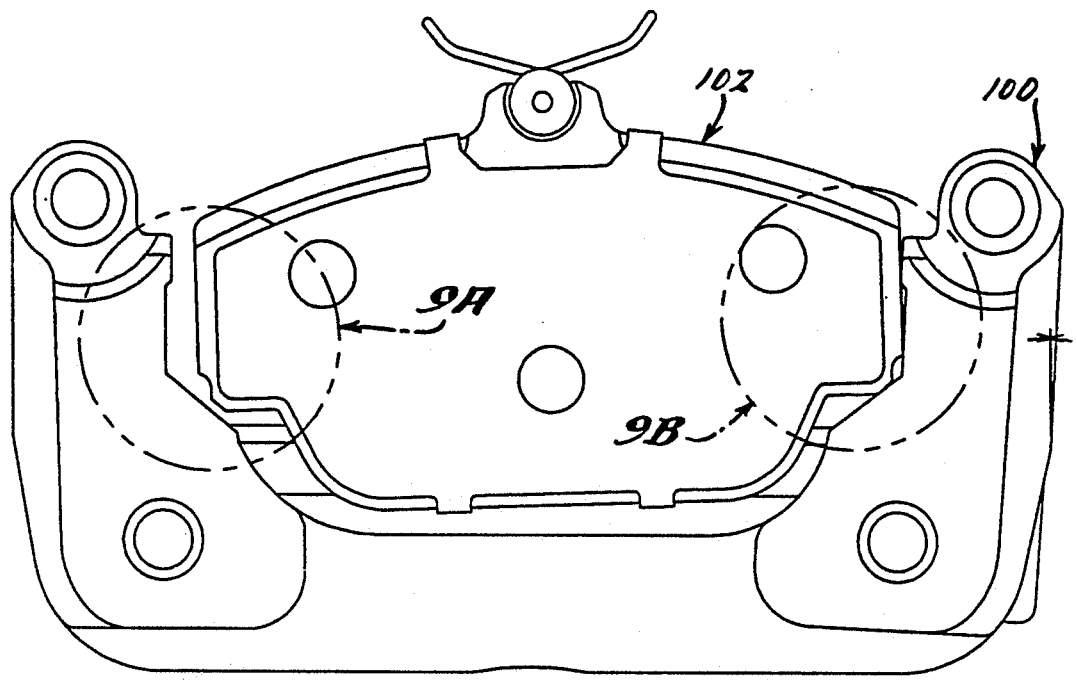
FIG. 9.
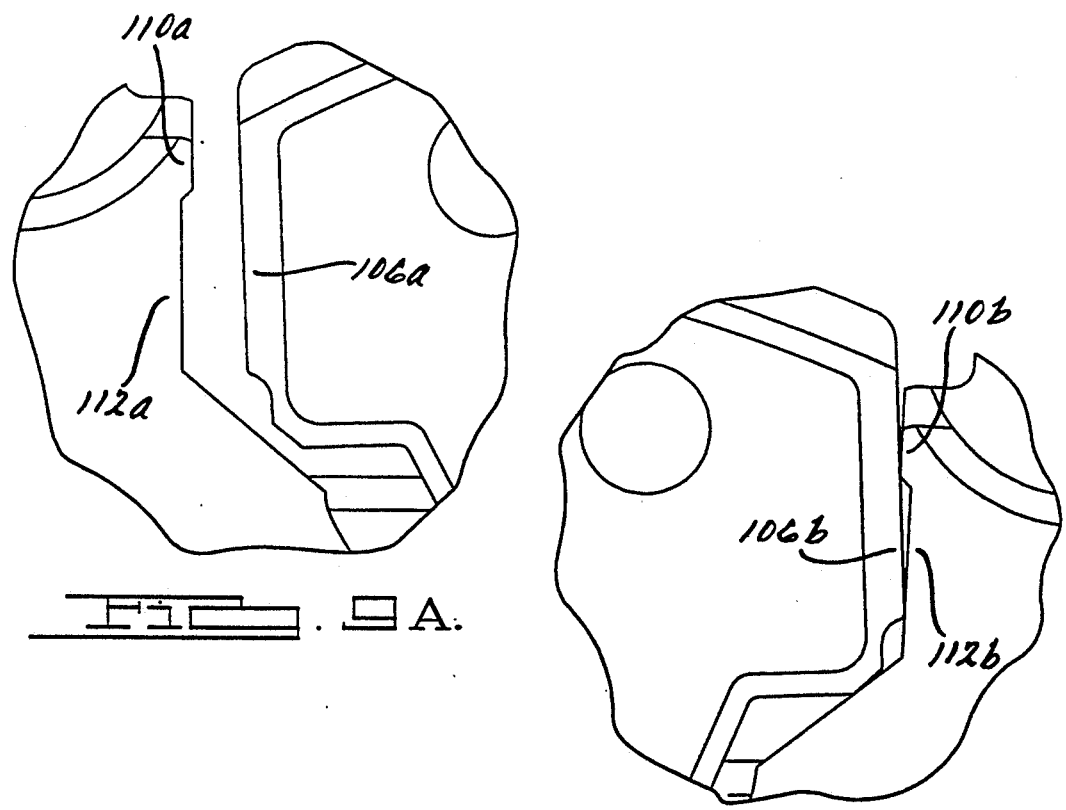
FIG. 9A.
FIG. 9B.

DISC BRAKE FRICTION PAD ASSEMBLY

BACKGROUND OF THE INVENTION

The present invention generally relates to sliding caliper disc brakes, and particularly to a friction pad assembly therefor.

Sliding caliper disc brakes have been widely employed in a variety of automotive braking applications. For example, the Rath et. al. U.S. Reissue Pat. No. 30,255, entitled "Sliding Caliper Disc Brakes" reissued on Apr. 8, 1980, describes a particularly successful brake design, which is sometimes referred to herein as a "Colette" brake. This reissue patent is hereby incorporated by reference.

As described in the above-referenced patent, the disc brake includes a pair of opposing friction pad assemblies which are forced into engagement with a turning rotor or "disc" of the automobile wheel structure when the brake is applied to slow or stop the vehicle. A discussion of such friction pad assemblies may be found in Wienand et. al. U.S. Pat. No. 4,056,174, issued on Nov. 1, 1977, entitled "Friction Pad Assemblies For Sliding Caliper Disc Brakes" and Meyer et al U.S. Pat. No. 4,527,669, issued on Jul. 9, 1985, entitled "Friction Pad Assemblies For Use In Disc Brakes". Each of these patents are hereby incorporated by reference.

There are a number of significant considerations that may affect the design of a disc brake friction pad assembly. For example, the amount and direction of the force involved affect more than just the size of the friction pad assembly and the carrier or bracket that supports the friction pad assembly. In this regard, it should be appreciated that when the friction pad engages the rotor, substantial force will be brought to bear against the bracket by at least one abutment of the friction pad assembly. The direction of this force will be generally tangential to the arc created by the turning rotor. When a heavy braking force is generated, the bracket itself may deflect elastically, even though the bracket has substantial mass and strength. Accordingly, the application of a heavy braking force may have the effect of opening and changing the geometry of the area within which the friction pad assembly resides, and hence lifting the friction pad assembly off the bracket at the opposite or non-loaded end.

With a friction pad assembly having only a single upper abutment, a large reaction force will be borne by this abutment in high vehicle deceleration stops. Further, this large reaction force creates a large moment that must be reacted by the contact surface of the bracket at the opposite end of the pad. These large forces result in high bearing stresses which must be reacted by the pad and bracket. The size of the abutment bearing stresses can be reduced and the moment can be eliminated by the usage of a second, lower abutment or a large single abutment to share the reaction force. However, with dual abutments or a large single abutment, the angular deflection of the bracket which can occur during high deceleration stops can cause the non-loaded end of the friction pad assembly to lift away from the bracket. When the brake is released, the friction pad assembly may drop onto the bracket with an unwanted "clacking" noise. In this regard, it should be noted that a release of brake clamping pressure could cause the deflected arm of the bracket to act like a spring, and potentially accelerate the movement of the friction pad assembly back to its rest position.

Additionally, and importantly, it should be understood that the disc brake design needs to work effectively over extended periods of use. Thus, for example, the design of the friction pad assembly and the caliper should minimize the potential for unnatural wear to occur. Furthermore, the environment within which the disc brake has to operate is less than ideal. In this regard, the disc brake needs to accommodate the repeated presence of external contaminates, such as water, dirt, grease and salt, as well as contend with substantial swings in temperature.

Accordingly, it is a principal objective of the present invention to provide a friction pad assembly for a sliding caliper disc brake which is adapted to operate smoothly and effectively under heavy load conditions, such as when a substantial braking force is applied in an automobile or other wheeled vehicle.

It is another objective of the present invention to provide a friction pad assembly for a sliding caliper disc brake which avoids pad climbing or lifting during brake application or pad induced noise upon brake release.

It is a further objective of the present invention to provide a friction pad assembly for a sliding caliper disc brake which does not present corrosion concerns during extended periods of use in adverse environmental conditions.

It is an additional objective of the present invention to provide a friction pad assembly for a sliding caliper disc brake which will help to avoid undue wear, such as burnishing or indenting of the bracket.

SUMMARY OF THE INVENTION

To achieve the foregoing objectives, the present invention provides a friction pad assembly and backing plate therefor which features a pair of opposing upper and lower abutments, with the engagement surface of the lower abutments being recessed by a predetermined magnitude relative to the engagement surfaces of the upper abutments. More particularly, the lower abutments are recessed relative to the upper abutments, such that lower abutments will not contact the bracket which supports the friction pad assembly under resting and light braking conditions. Rather, the lower abutments at the loaded end of the friction pad assembly will only come into contact with the caliper bracket during heavy braking conditions to distribute the force being applied to the caliper bracket. While the force applied by the lower abutment to the caliper under heavy braking conditions may cause the non-loaded end of the friction pad assembly to lift slightly, the clearance will be too small to cause perceptible clacking noise upon brake release.

The upper and lower abutments are positioned such that the line of tangential force lies therebetween. In other words, the upper abutments are located above the line of tangential force, while the lower abutments are located below the line of tangential force. The upper and lower abutments may also be defined in part by a channel which is interposed between corresponding upper and lower abutments.

In accordance with one embodiment of the present invention, the backing plate also includes a pair of angled abutments which are located at opposite ends of the backing plate, at a level which is below the lower abutments. Alternatively, the backing plate may include a pair of opposing base abutments at opposite ends of the backing plate, at a level which is below the lower abutments. Each of the base abutments preferably includes a planar engagement surface which extends substantially perpendicular to the planar engagement surfaces of the upper and lower abutments.

Additional features and advantages of the present invention will become more fully apparent from a reading of the detailed description of the preferred embodiment and the accompanying drawings in which:

BRIEF DESCRIPTION OF THE DRAWINGS

FIGS. 2A and 2B provide two elevation views of a friction pad assembly in accordance with the present invention.

FIG. 3A shows a rear elevation view of the friction pad assembly, and FIG. 3B shows an enlarged portion of the backing plate to illustrate a recessed lower abutment.

FIG. 5 shows a diagrammatic view of the friction pad assembly and the caliper in a light braking condition. FIGS. 5A-5B show enlarged portions of the engagement regions depicted in FIG. 5.

FIG. 6 shows a diagrammatic view of the friction pad assembly and the caliper in a heavy braking condition. FIGS. 6A-6B show enlarged portions of the engagement regions depicted in FIG. 6.

FIG. 7 shows a diagrammatic view of a second embodiment, with the friction pad assembly and a caliper in a resting condition. FIGS. 7A-7B show enlarged portions of the engagement regions depicted in FIG. 7.

FIG. 8 shows a diagrammatic view of the friction pad assembly and the caliper of the second embodiment in a light braking condition. FIGS. 8A-8B show enlarged portions of the engagement regions depicted in FIG. 8.

FIG. 9 shows a diagrammatic view of the friction pad assembly and the caliper of the second embodiment in a heavy braking condition. FIGS. 9A-9B show enlarged portions of the engagement regions depicted in FIG. 9.

DETAILED DESCRIPTION OF THE PREFERRED EMBODIMENTS

Figure 1:
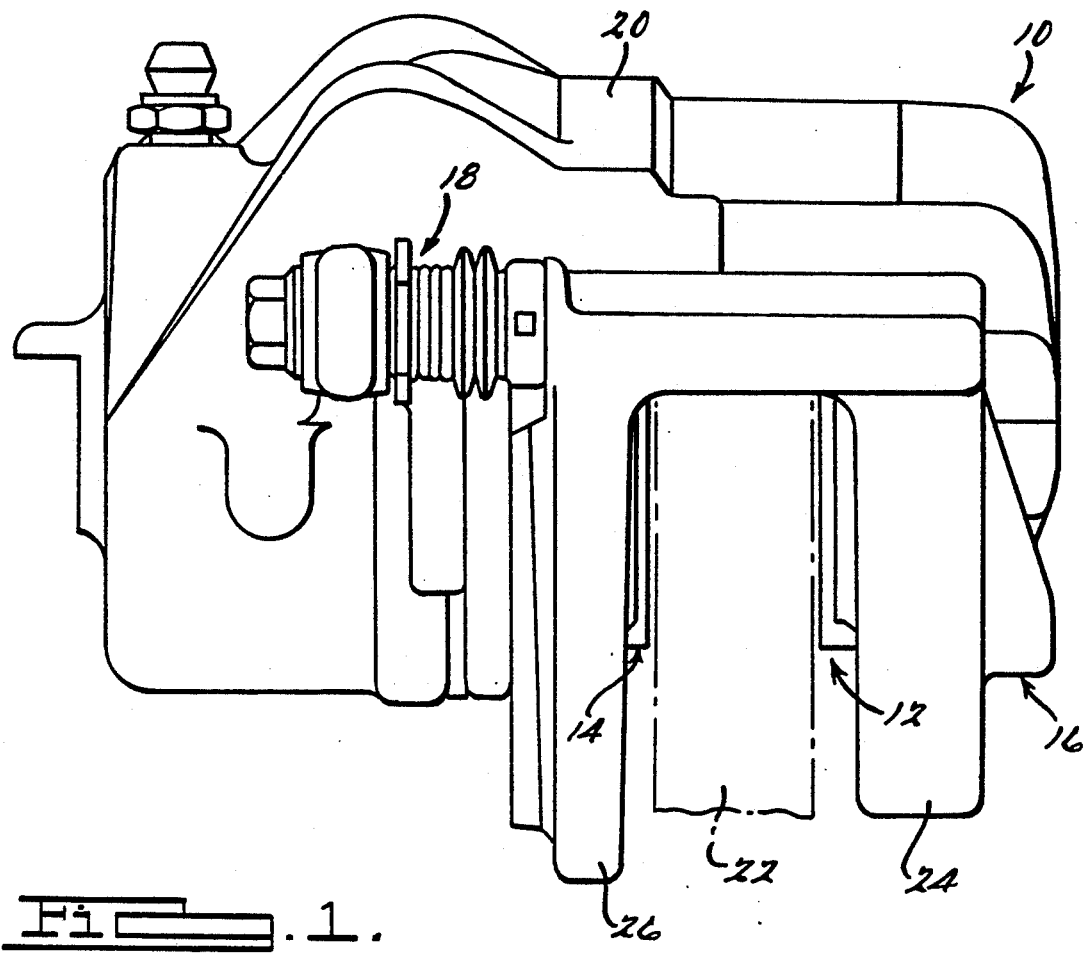
FIG. 1 is a side elevation view of a sliding caliper disc brake which utilizes a friction pad assembly according to the present invention.

Referring to FIG. 1, a side elevation view of a sliding caliper disk brake 10 is shown. The disc brake 10 includes a pair of friction pad assemblies 12 and 14 in accordance with the present invention. The friction pad assemblies 12-14 are supported by a bracket 16, which is mounted to the vehicle. The bracket 16 also supports a pair of guide pin assemblies, such as the guide pin assembly 18. The guide pin assemblies enable the housing 20 of the disc brake 10 to slide axially with respect to the bracket 16. The axial movement of the housing 20 is responsive to a hydraulically actuated piston which is contained therein. More specifically, when the brake pedal of the vehicle is depressed, hydraulic fluid will be forced into the disc brake 10, and this hydraulic pressure will cause the internal piston to move axially toward a brake disc 22. This, is turn, will cause the inboard friction pad assembly 14 to move into contact or engagement with a disc or rotor 22, and concomitantly cause the housing 20 to slide in the opposite axial direction. The axial movement of the housing 20 will cause the outboard friction pad assembly 12 to come into contact with the other side of the rotor 22, so that braking pressure is applied to both sides of the rotor. Once the vehicle brake pedal is released, the hydraulic pressure on the internal piston will also be released allowing the pads to move away from the brake disc 22, and thereby cause the disc brake 10 to return to the rest position shown in FIG. 1.

The bracket 16 includes an outboard bracket support structure 24 and an inboard bracket support structure 26. In this regard, it should be appreciated that the outboard bracket support structure 24 supports the outboard friction pad assembly 12, and that the inboard bracket support structure 26 supports the inboard friction pad assembly 14. A further description of these support structures will be presented in connection with FIGS. 4-6. However, it should be noted that the bracket support structures 24-26 are preferably constructed such that only a single friction pad assembly design need be employed. In other words, the outboard and inboard friction pad assemblies 12-14 should have the identical construction for installation and replacement simplicity.

Figure 2A:
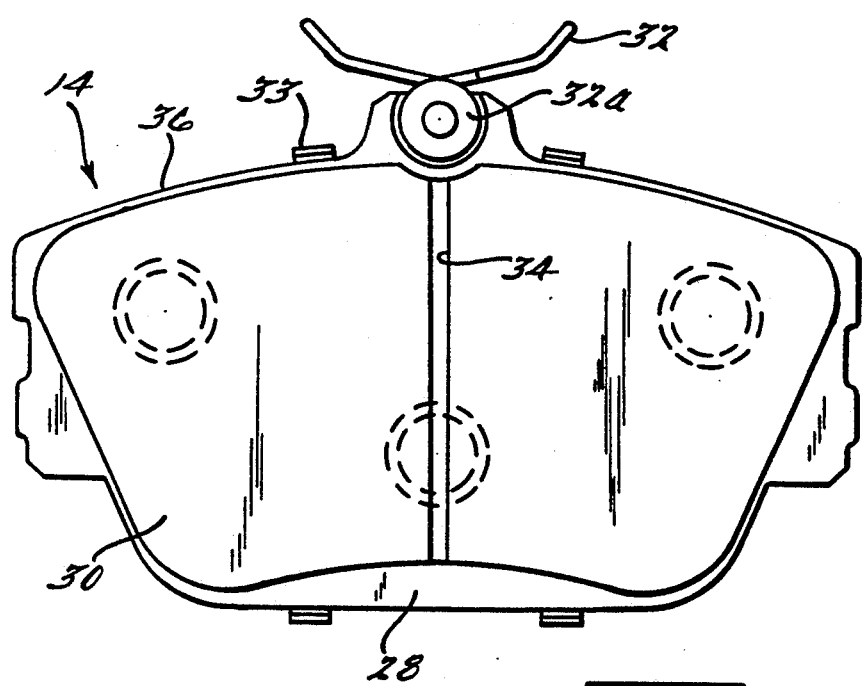

Referring to FIGS. 2A and 2B, two elevation views of the friction pad assembly 14 is shown. The friction pad assembly 14 generally includes a backing plate 28 and a friction pad 30 which is fixedly secured to one side of the backing plate. In one form of the present invention, the friction pad assembly 14 also includes a spring 32 which is mounted in an arcuate or semicircular recess behind washer 32a in the backing plate 28. The spring 32 serves an anti-rattling function, as it urges the backing plate 28 into contact with the bracket support structure 26. However, it should be appreciated that the spring 32 need not be fixedly secured to the backing plate in the appropriate application, as many other configurations may be employed. The friction pad assembly 14 may also include additional devices to reduce noise, such as shim plate 33. In this regard, the shim plate 33 may be mounted to the face or side of the backing plate 14 opposite from that which the friction pad 30 is mounted.

In one particular embodiment, the friction pad 30 is formed with a relatively deep channel 34 which runs generally along a center line down the friction pad assembly 14. The channel 34 essential cuts the friction pad 30 in half in order to reduce noise, thermal stress, bending stress and so forth. It should also be noted that the friction pad 30 has a curved trapezoidal shape which places the widest span of the friction pad near the top of the friction pad assembly 14. However, it should be appreciated that other suitable friction pad shapes may be employed in the appropriate application.

Referring now to FIG. 3A, the backing plate 28 is shown to be formed with a curved top surface 36 which generally follows the outer diameter of the rotor 22. The backing plate 28 may also include a beveled surface 38 which slants downwardly from the top surface 36 toward the face of the backing plate which is opposite that of the friction pad 30. The backing plate 28 also includes a pair of outwardly projecting upper abutments 40a-40b and pair of outwardly projecting lower abutments 42a-42b. As illustrated in FIG. 3A, the upper abutment 40a and the lower abutment 42a are located at one end of the backing plate 28, while the upper abutment 40b and the lower abutment 42b are located at the opposite end of the backing plate. The upper abutments 40a-40b are aligned with each other, and the lower abutments 42a-42b are also aligned with each other. In other words, the left-hand side of the friction pad assembly 14 is preferably a mirror image of the right-hand side of the friction pad assembly.

The upper abutments 40a-40b are positioned at a level or height on the backing plate 28 that corresponds to the end of the curve top surface 36. The lower abutments 42a-42b are separated from their corresponding upper abutments 40a-40b by a groove or channel. More specifically, a channel 44a is provided between the upper abutment 40a and the lower abutment 40b. Similarly, a channel 44b is provided between the upper abutment 42a and the lower abutment 42b. Each of these abutments includes a generally flat or planar engagement surface, such as engagement surface 46a for the upper abutment 40a, and the engagement surface 48a for the lower abutment 42a. As illustrated in FIG. 3A, the engagement surface 46a extends in a parallel or substantially parallel direction with respect to the engagement surface 48a. Indeed, it should be appreciated that the engagement surfaces for each of the abutments 40a-40b and 42a-42b extend in a parallel or substantially parallel direction with respect to a center line running down the friction pad assembly 14, as represented by the groove 34. However, it should be appreciated that other suitable orientations may be possible in the appropriate application. For example, the planar engagement surfaces 48a-48b of the lower abutments 42a-42b could extend at an angle relative to the planar engagement surfaces 46a-46b of the upper abutments 40a-40b to reflect the angular displacement of the bracket support structure 26 during heavy braking conditions. In other words, the recess near the top of the lower abutments 42a-42b would be less than the recess near the bottom of the lower abutments. Additionally, it should be appreciated that the desired recess could be built into the bracket support structure 26, rather than being built into the backing plate 28. In other words, the backing plate 28 could be formed with a single large abutment, and the bracket support structure 26 could be formed with a recess which would correspond to that provided in the present embodiment by the lower abutments 42a-42b. This alternative embodiment will be discussed further in connection with FIGS. 7-9. In any event, it should be understood in the context of the present embodiment that the upper abutments 40a-40b should be located above the line of tangential force which is applied during braking action, and the lower abutments 42a-42b should be located below the line of tangential force.

FIG. 3B shows an enlarged portion of the backing plate to illustrate the upper abutment 40a and the lower abutment 42a in more detail. Importantly, as depicted in FIG. 3B, it should be apparent that the engagement surface 48a of the lower abutment 42a is recessed with respect to the engagement surface 46a of the upper abutment 40a. The purpose of this abutment recess will be explained more fully in connection with FIGS. 4-6. However, at present, it should be noted that the recessed lower abutment 42a is designed such that it will not contact its bracket support structure, such as bracket support structure 26, during rest or light braking conditions. Rather, the recessed lower abutment 42a will only come into contact with its bracket support structure during heavy braking conditions. In one particular embodiment herein, the magnitude of the recess is between 0.1 mm and 0.25 mm, with the most preferred range being between 0.15 mm and 0.20 mm. However, in general, this recess should be selected to correspond to the angular deflection of the support structures 24 and 26 at a moderately high braking level, at which time the lower abutment will make contact with its bracket support structure.

It should also be noted that the length of the engagement surface 46a of the upper abutment 40a (e.g., 8.0 mm) is slightly greater than the length of the engagement surface 48a of the lower abutment 42a (e.g., 7.5 mm). However, it should be understood that the relative lengths of these two engagement surfaces may be modified in the appropriate application. In any event, the length of the engagement surface 46a of the upper abutment 40a should be such as to provide an area of contact sufficient to resist the applied loads, while at the same time minimized to prevent the accumulation or build up of rust and/or other contaminants. The width of the engagement surfaces for the upper abutments 40a-40b and the lower abutments 42a-42b will generally correspond to the thickness of the backing plate 28 itself. In this regard, the thickness of the backing plate 28 will depend upon the specific application of the disc brake 10 (e.g., 5.5 mm to 6.5 mm). It may also be noted at this point that the width of the engagement surfaces for the corresponding abutments on the bracket 26 should be sufficient to accomodate at least the full wear of the friction pad lining 30.

FIGS. 3A and 3B also illustrate that the backing plate 28 may also be provided with a pair of angled abutments 50a-50b, which are located at opposite lower corners of the backing plate. The presence of the angled abutments 50a-50b enable the friction pad assembly 14 to have a rocking action in cooperation with and relative to its bracket support structure. The angled abutments 50a-50b are disposed below their respective lower abutments 42a-42b. However, the angled abutments 50a-50b could extend from the lower abutments 42a-42b in the appropriate application.

The backing plate 28 is also shown to include a pair of opposing base abutments 52a-52b, which extend inwardly from the angled abutments 50a-50b. While the base abutments 52a-52b do not engage the bracket support structure in this design, it should be appreciated that the base abutments could alternately be applied in the place of the angled abutments 50a-50b as the engagement surface. In one particular embodiment herein, the angled abutments are formed with a planar engagement surface (i.e., engagement surfaces 53a-53b) which is at a 39 to 41 degree angle with respect to the corresponding engagement surface of the base abutments 52a-52b. In a design where the base abutments 52a-52b are employed in lieu of the angled abutments, the base abutments are preferably provided with an engagement surface which extends in a generally perpendicular direction to the engagement surfaces of the upper abutments 40a-40b and the lower abutments 42a-42b. The backing plate 28 further includes a bottom surface 54 which continues from the termination of the base abutments 52a-52b to complete the outline of the backing plate.

Figure 4:
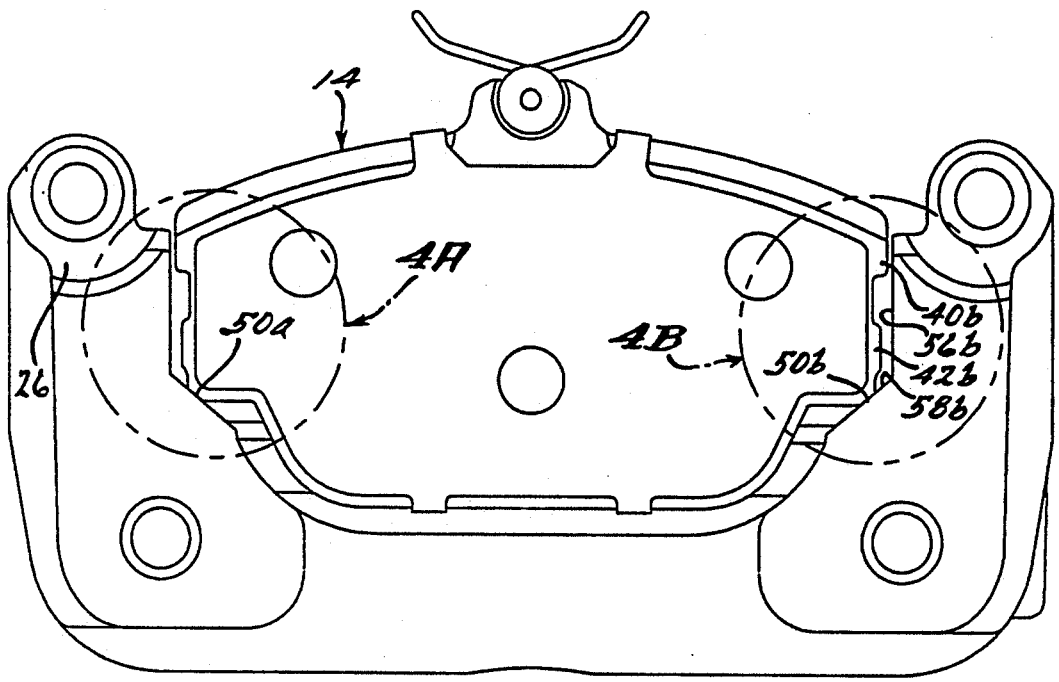
FIG. 4 shows a diagrammatic view of the friction pad assembly and a caliper in a resting condition.
Figure 4A:
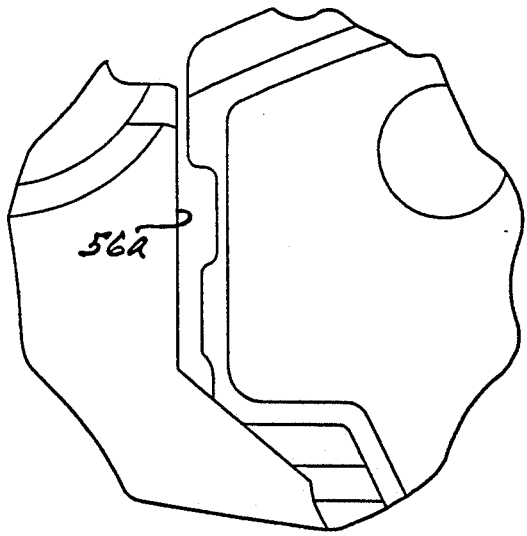
FIGS. 4A-4B show enlarged portions of the engagement regions depicted in FIG. 4.
Figure 4B:
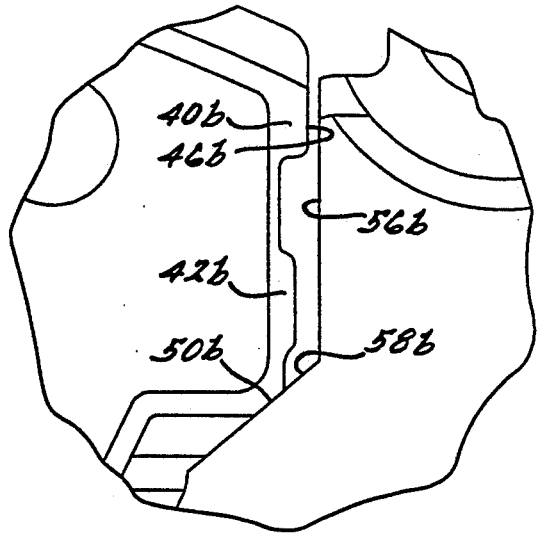

Referring to FIG. 4, a diagrammatic view of the friction pad assembly 14 and the caliper bracket 26 are shown in a resting condition. FIG. 5 provides a corresponding view during a light braking condition. Similarly, FIG. 6 provides a corresponding view during a heavy braking condition. The combination of these three views is provided to illustrate the operation of the present invention. Additionally, the engagement regions shown in each of these figures are also shown in enlarged views, such as FIGS. 4A–4B for further clarity. The clearances in each of these figures have been exaggerated for illustration purposes in order that the invention may be better understood. Similarly, the bracket deflection presented in FIG. 6 has also been exaggerated for illustration purposes.

It should first be noted that the caliper bracket 26 is formed with a set of engagement surfaces which are adapted to cooperate with the engagement surfaces of the upper, lower, angled and base abutments, as described above. For example, the caliper bracket 26 includes a lateral engagement surface 56b which extends in parallel to the engagement surface 46b of the upper abutment 40b and the engagement surface 48b of the lower abutment 42b. Similarly, the caliper bracket 26 includes an angled abutment surface 58b which extends in parallel to the engagement surface 53b of the angled abutment 50b for the backing plate 28. In light of the fact that the friction pad assembly 14 and the bracket support structure 26 need to slide freely with respect to each other, a suitable, but small clearance should be provided between these two components. Thus, for example, in one particular embodiment herein, an average clearance between 0.175 mm and 0.325 mm is provided to separate the engagement surface 46b of the backing plate 28 and the lateral engagement surface of the bracket support structure 26.

As shown in FIG. 4, the friction pad assembly 14 will be centered on the caliper bracket 26 during a resting condition when the disc brake 10 is not applied to slow or stop the vehicle. In this resting condition, the angled abutments 50a–50b of the backing plate 28 will contact the corresponding angled engagement surfaces of the bracket support structure 26, as the spring 32 urges the friction pad assembly 14 into downward engagement for the orientation illustrated. However, during a light braking condition, as shown in FIG. 5, the engagement surface 46b of the upper abutment 40b for the backing plate 28 will come into contact with the lateral engagement surface 56b of the bracket support structure 26, assuming that the rotor 22 is turning in a clockwise direction. In such a light braking condition, a tangential force is applied by the friction pad assembly 14 to the bracket support structure 26 due the contact pressure of the friction pad assembly against the spinning rotor 22. This tangential force will cause a loading of pressure at the angled abutment 50a of the backing plate 14. Accordingly, the engagement surface 53a of the angled abutment 50a for the backing plate 14 will not lift off the corresponding angled engagement surface of the bracket support structure 26.

During heavy or high braking torque conditions, as shown in FIG. 6, the bracket support structure 26 may undergo flexible deflection in the direction of the tangential force being applied by the friction pad assembly 14. This deflection may be a combination of translation and angular movement. As a result of the angular deflection, the engagement surface 48b of the lower abutment 42b for the backing plate 28 will come into contact with the lateral engagement surface 56b of the bracket support structure 26. In this way, the lower abutment 42b will distribute a portion of the reaction force being applied and avoid undue wear on the bracket support structure 26. At higher levels of braking, the carrier arm angular deflection will be even greater, and a small clearance may also result between the engagement surface 53a of the angled abutment 50a for the backing plate 28 and the corresponding angled engagement surface 60a of the bracket support structure 26. However, this clearance will not be large enough to cause a perceptible clacking sound when the disc brake 10 is released back to its resting condition.

Turning now to FIGS. 7–9, a second embodiment of the present invention is shown. In this embodiment, the desired recess in the engagement region is provided by the bracket 100 rather than by the friction pad assembly 102. In this regard, the backing plate 104 of the friction pad assembly 102 is formed with a single pair of opposing lateral abutments 106a–106b. Each of these abutments 106a–106b is provided with a planar engagement surface, such as the engagement surface 108b for the abutment 106b. In contrast, the bracket 100 is formed with a pair of opposing upper abutments 110a–110b and a pair of opposing lower abutments 112a–112b. As shown in FIGS. 7 and 7A–7B, the lower abutments 112a–112b are recessed with respect to the upper abutments 110a–110b. More specifically, the lower abutment 112b is formed with a planar engagement surface 114b which is recessed relative to a planar engagement surface 116b of the upper abutment 110b.

As in the case of FIG. 4, the bracket 100 and the friction pad assembly 102 of FIG. 7 are shown in a resting condition. Similarly, FIG. 8 provides a corresponding view during a light braking condition, and FIG. 9 provides a corresponding view during a heavy braking condition. Additionally, it should be appreciated that the clearances between the bracket 100 and the friction pad assembly 102 have been exaggerated for illustration purposes. Likewise, the bracket deflection depicted in FIG. 9 has also been exaggerated to facilitate an understanding of the invention.

The present invention has been described in an illustrative manner. In this regard, it is evident that those skilled in the art once given the benefit of the foregoing disclosure, may now make modifications to the specific embodiments described herein without departing from the spirit of the present invention. Such modifications are to be considered within the scope of the present invention which is limited solely by the scope and spirit of the appended claims.

What is claimed is:

1. A friction pad assembly for a sliding caliper disc brake, comprising:
    a backing plate, said backing plate having a pair of upper and lower abutments at each end of said backing plate, each of said upper and lower abutments including an engagement surface which extends in a generally radial direction which is substantially parallel to a center line through said backing plate, said lower abutments being recessed by a predetermined magnitude relative to said upper abutments; and
    a friction pad secured to said backing plate.

2. The invention according to claim 1, wherein the engagement surface of each of said upper abutments extend beyond the corresponding engagement surface of each of said lower abutments by an amount which corresponds to an angular deflection of a bracket support structure of said disc brake during heavy braking conditions.

3. The invention according to claim 1, wherein said upper abutments are located above a line of tangential force which results from braking action, and said lower abutments are located below said line of tangential force.

4. The invention according to claim 1, wherein said backing plate includes a curved top surface, and each of said upper abutments is formed on said backing plate generally adjacent to each end of said curved top surface.

5. The invention according to claim 1, wherein said backing plate includes a pair of angled abutments which are located at opposite lower corners of said backing plate.

6. The invention according to claim 5, wherein said angled abutments are disposed below said lower abutments.

7. The invention according to claim 1, wherein said backing plate includes a pair of opposing base abutments which are located at opposite lower corners of said backing plate.

8. The invention according to claim 7, wherein each of said base abutments includes a planar engagement surface which extends in a substantially perpendicular direction to a planar portion of the engagement surfaces of said upper and lower abutments.

9. In a disc brake having an inboard friction pad assembly and an outboard friction pad assembly, a backing plate for each of said friction pad assemblies, characterized in that:

said backing plate has a pair of upper and lower abutments at each end thereof, with each of said abutments having a planar engagement surface which extends in a generally radial direction which is substantially parallel to a center line through said backing plate, and the engagement surfaces of said lower abutments being recessed by a predetermined magnitude relative to the engagement surfaces of said upper abutments.

10. The invention according to claim 9, wherein said backing plate includes a pair of angled abutments which are located at opposite ends of said backing plate below said lower abutments.

11. The invention according to claim 9, wherein said backing plate includes a pair of opposing base abutments which are located at opposite ends of said backing plate below said lower abutments, each of said base abutments including a planar engagement surface which extends substantially perpendicular to the planar engagement surfaces of said upper and lower abutments.

12. The invention according to claim 9, wherein the length of the planar engagement surfaces of said lower abutments is substantially equal to the length of the planar engagement surfaces of the upper abutments.

13. In a disc brake having a sliding caliper, said sliding caliper having an inboard bracket support structure and an outboard bracket support structure, a friction pad assembly for each of said bracket support structures, comprising:

a backing plate which generally conforms to a common outline shape for both of said bracket support structures, said backing plate having a pair of upper and lower abutments at each end of said backing plate, each of said abutments having a planar engagement surface which extends in a generally radial direction which is substantially parallel to a center line through said backing plate, the engagement surfaces of said lower abutments being recessed by a predetermined magnitude relative to the engagement surfaces of said upper abutments; and a friction pad secured to said backing plate.

14. The invention according to claim 13, wherein the planar engagement surface of each of said lower abutments is recessed by an amount which corresponds to an angular deflection of said bracket support structure during heavy braking conditions.

15. In a disk brake having a friction pad assembly and a bracket which supports said friction pad assembly, said friction pad assembly having at least one abutment surface, an engagement region between said abutment surface of said friction pad assembly and said bracket being characterized in that a recess is provided along a lower portion of said engagement region, said recess having a depth corresponding to an angular deflection of said bracket during heavy braking conditions.

16. The invention according to claim 15, wherein said bracket includes a pair of opposing upper abutments and a pair of opposing lower abutments, and said recess constituting one of said lower abutments.

* * * * *